United States Patent [19]

Iden et al.

[11] Patent Number: 5,317,500
[45] Date of Patent: May 31, 1994

[54] ACTIVE NO-BREAK POWER TRANSFER CONTROL FOR A VSCF POWER GENERATING SYSTEM

[75] Inventors: Steven M. Iden, Belvidere; Edwin J. Shires; Waleed Said, both of Rockford, all of Ill.

[73] Assignee: Sundstrand Corporation, Rockford, Ill.

[21] Appl. No.: 926,608

[22] Filed: Aug. 6, 1992

[51] Int. Cl.⁵ .................. H02J 9/06; H02M 7/537
[52] U.S. Cl. .................. 363/98; 363/164; 363/165; 307/19; 307/66; 307/87
[58] Field of Search .............. 363/71, 72, 95, 98, 363/164, 165, 35; 307/43-46, 64-66, 84-87, 125, 129, 18-20; 364/492, 701; 323/237, 241, 246; H02M 7/537, 7/5378

[56] References Cited

U.S. PATENT DOCUMENTS

| | | | |
|---|---|---|---|
| 3,932,764 | 1/1976 | Corey | 307/85 |
| 4,453,206 | 6/1984 | Voight | 363/21 |
| 4,707,142 | 11/1987 | Baker et al. | 368/46 |
| 4,728,806 | 3/1988 | Baker et al. | 307/43 |
| 4,754,161 | 6/1988 | Fox | 307/87 |
| 4,766,327 | 8/1988 | Fox | 307/87 |
| 4,875,149 | 10/1989 | Rozman et al. | 363/41 |
| 4,905,134 | 2/1990 | Recker et al. | 363/98 |
| 4,937,462 | 6/1990 | Recker et al. | 307/19 |
| 4,956,598 | 9/1990 | Recker et al. | 322/28 |
| 5,012,437 | 4/1991 | Recker et al. | 364/701 |

*Primary Examiner*—Steven L. Stephan
*Assistant Examiner*—Adolf Berhane
*Attorney, Agent, or Firm*—Marshall, O'Toole, Gerstein, Murray & Borun

[57] ABSTRACT

An improvement in a control for a DC link power converter includes a phase command signal generator responsive to DC power on a DC link wherein the phase command signal generator develops a phase command signal for a control of the power converter whereby a parameter the DC power is caused to approach a certain level.

12 Claims, 4 Drawing Sheets

ACTIVE NO-BREAK POWER TRANSFER CONTROL FOR A VSCF POWER GENERATING SYSTEM

TECHNICAL FIELD

The present invention relates generally to power system controls, and more particularly to a control that transfers a load between a source of AC power and a DC link based electronic power conversion system without significant disruption in load current.

BACKGROUND ART

There are numerous applications where it is necessary or desirable to disconnect one or more loads from one power supply and to connect the load(s) to another power supply with minimum disruption in the load current. In aircraft and aerospace applications, a load transfer may be required between power sources external to and on-board the aircraft or between separate on-board power sources. Prior on-board power sources have been typically of the constant speed type having a hydromechanical constant speed drive coupled to the engine of the aircraft which converts the variable-speed motive power produced by the engine into constant-frequency AC power for the loads. Such a system is sometimes referred to as an integrated drive generator (or IDG).

An alternative to the foregoing power source that does not use a constant speed drive is referred to as a DC link power generating system wherein DC power on a DC link is converted into constant-frequency AC power. One type of DC link power generating system is known as a variable-speed, constant-frequency (VSCF) generating system which includes a synchronous generator coupled directly to the aircraft engine and a power converter which converts the variable frequency output of the generator into constant frequency power for the loads. In multiple aircraft having engines each engine typically drives a separate VSCF system (sometimes referred to as a "channel") and the system outputs are coupled to a load bus through contactors. Interest in VSCF systems has increased of late owing to the push to design "all electric" aircraft in which the use of mechanical, hydromechanical and hydraulic components is minimized.

In a multiple-channel VSCF system of the above type, it may be necessary to change the source of power to the load bus from one channel to another or between an external AC source, such as a ground power cart, and one of the channels.

Recker, et al, U.S. Pat. No. 4,937,462 discloses a no-break power control for a VSCF power generating system. The system senses the deviation of a parameter of the power developed by an inverter of the VSCF system relative to a parameter of the power developed by an AC power source and controls the inverter in accordance With such deviation to cause the parameter of the power developed thereby to approach the parameter of the power developed by the AC power source. The inverter in the VSCF system and the AC power source are connected in parallel across one or more loads when the parameter deviation is within a certain range. Either the inverter or the AC power source is thereafter disconnected at a certain time after the two have connected in parallel to complete the power transfer.

The Recker, et al. control is effective to bring the inverter and the AC power source into synchronism so that parallel connection across a load is possible. However, during the time that the inverter and the AC power source are connected in parallel, (which may be, for example, up to 200 ms. for 400 a hz. power system) the inverter or the AC power source may drift in frequency and output voltage, resulting in increasing circulating current during the parallel time. Also, some initial voltage magnitude and phase errors may be experienced.

The possible voltage magnitude, frequency and phase errors between a pair of AC sources can result in undesirable circulating currents and power transfers. For example, voltage mismatches in the ten volt range can result in 53 amps of circulating reactive current while a phase mismatch of up to 30° can result in up to 440 amps of real current being passed between the two sources. When a solid state source such as a VSCF generator system lags a further AC source in phase, the former receives real power which must be dissipated or stored. Dissipation requires an active suppressor which adds weight and complexity to the VSCF system. Stored energy may be handled to some extent by the DC link filter capacitor typically used in DC link systems. However, this capacitor is usually only sized to handle ripple current and must therefore be made much larger to store the required worst case real power resulting from phase errors. For the case where the VSCF system leads the external AC power source, currents developed by the VSCF system are delivered to the other source, leading to a sagging DC link voltage. If this sag becomes large enough high levels of reactive current can flow and damage the inverter and/or cause tripping of contractors. Another operational difficulty is the inaccurate measurement of output power parameter(s) due to distortion in the output waveform, frequency transients or the like.

Corey, U.S. Pat. No. 3,932,764 discloses a method and apparatus for transferring an electrical load from a utility AC power source to an inverter. The utility AC power source and the inverter are momentarily connected in parallel across the load and the inverter output voltage and phase are controlled to null the current provided by the AC source. Thereafter, the AC source is disconnected from the load to complete the power transfer.

SUMMARY OF THE INVENTION

In accordance with the present invention, a control for a DC link power converter minimizes recirculating currents and power transfers between the power converter and a further AC source.

More particularly, according to one aspect of the present invention, an improvement in a DC link power converter includes a phase command signal generator responsive to DC power on a DC link of the power converter that develops a command signal wherein the command signal causes a parameter of the DC power to approach a certain level.

According to this aspect of the invention, the command signal generator includes a voltage detector that develops a voltage magnitude signal representing a DC voltage on the DC link. Further, the signal generator preferably includes a first summer for summing the voltage magnitude signal with a reference signal to develop an error signal and means responsive to the error signal for deriving the command signal from the error signal.

The deriving means preferably includes a scaler coupled to the first summer that develops a scaled representation of the error signal and a second summer coupled to the scaler that sums the scaled representation with a phase angle signal representing a phase angle between the phase displacement of the first AC waveform and a phase displacement of the second AC waveform. The deriving means may further include a gain and compensation circuit coupled to the second summer. Preferably, the gain and compensation circuit comprises a proportional plus integral loop and may further include a limiter coupled to the proportional plus integral loop.

According to one embodiment of the present invention, the inverter is disconnected from the load and receives a further command signal developed by a further command signal generator prior to a certain time. The further command signal generator preferably includes means for indicating a load magnitude prior to the certain time and means responsive to the indicating means for deriving the further command signal. Also preferably, the indicating means develops a load signal representing the load magnitude and the modifying means includes a lookup table accessed by the load signal and developing an offset signal.

According to another aspect of the present invention, a control for a DC power converter having an inverter that receives DC power carried on a DC link and produces an AC waveform at an output of the power converter wherein the first AC waveform and a second AC waveform produced by an AC power source are supplied to a load includes means responsive to a parameter of the DC power for developing a command signal representing a commanded phase relationship between the first and second AC waveforms. A control is coupled between the developing means and the inverter and is responsive to the command signal and causes the first AC waveform to approach the commanded phase relationship with respect to the second AC waveform.

In accordance with yet another aspect of the present invention, a signal generator for developing a phase command signal for control of a DC link power conversion system wherein the system includes an inverter operated by the control to convert a DC voltage having a magnitude on a DC link into a first AC voltage at an output of the system and wherein the first AC voltage and a second AC voltage produced by an AC power source are provided to a load and the first and second AC waveforms have first and second phase displacements, respectively, includes a voltage detector coupled to the DC link and developing a magnitude signal representing the DC voltage magnitude and a first summer coupled to the voltage detector that sums the magnitude signal with a reference signal to derive a first error signal. A scaler is coupled to the first summer for scaling the first error signal and means are provided for developing a phase angle signal representing a phase angle between the first and second phase displacements. A second summer is coupled to the scaler and the developing means that sums the scaled first error signal with the phase angle signal to derive a second error signal. A gain and compensation circuit is coupled to the second summer and develops the phase command signal from the second error signal.

The present invention controls a DC link power converter during the time that it is coupled in parallel with an AC power source across a load so that damaging recirculating currents and power transfers are minimized.

DESCRIPTION OF THE PREFERRED EMBODIMENT

Figure 1:
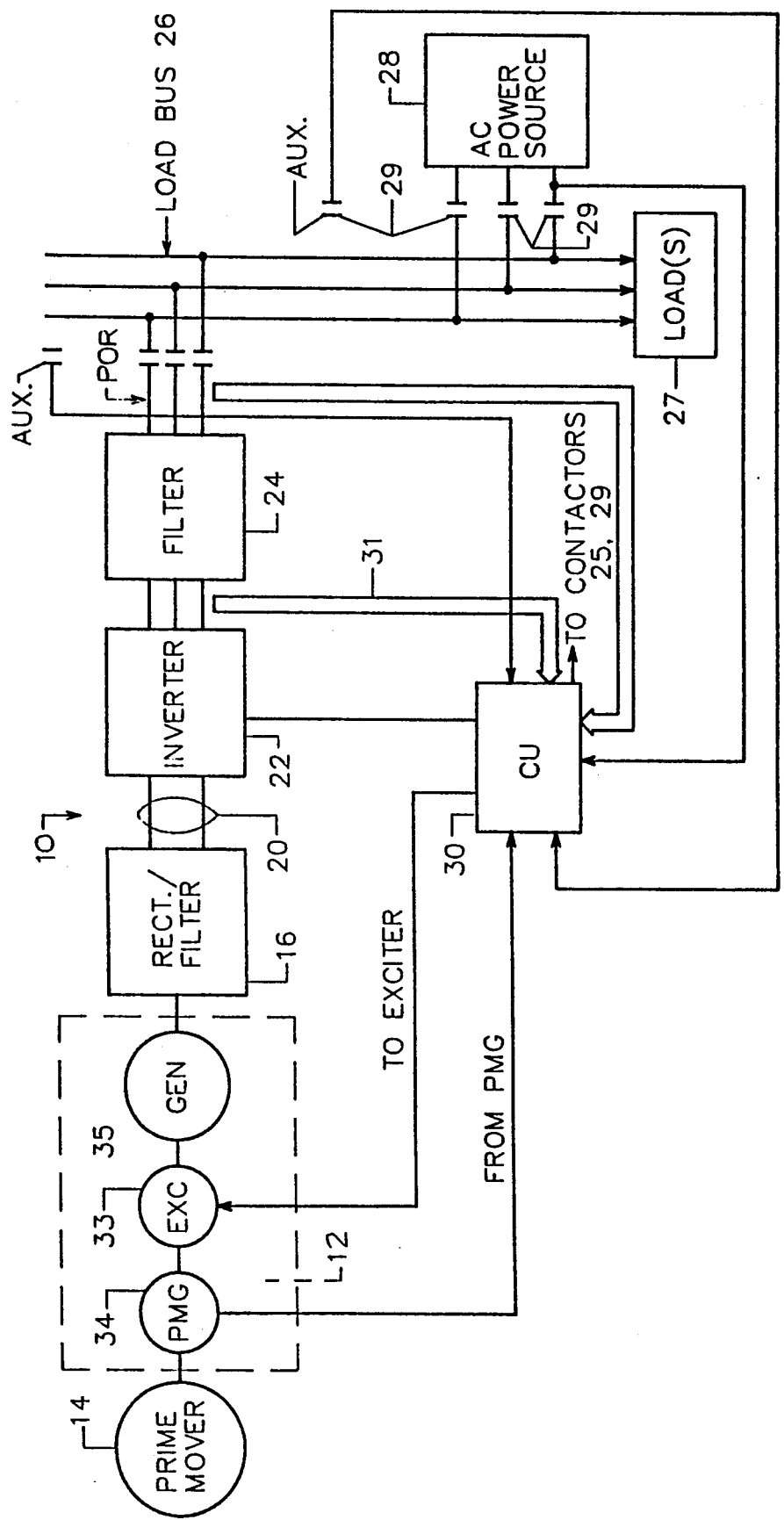
FIG. 1 is a block diagram of a DC link power conversion system incorporating the present invention in conjunction with an AC power source and a load bus.

Referring now to FIG. 1, a DC link power converter in the form of a variable-speed, constant-frequency (VSCF) system 10 is illustrated. The VSCF system 10 includes a brushless, synchronous generator 12 driven by a variable-speed prime mover 14 which may be, for example, an aircraft jet engine. The generator develops a polyphase, variable-frequency AC output which is converted into DC power by a rectifier/filter 16. The resulting DC power is provided over a DC link 20 to a polyphase inverter 22 which converts the DC power into three-phase constant-frequency AC power. This AC power may be filtered by an optional filter 24 and is provided via a controllable set of contactors 25 to a load bus 26. The load bus 26 is, in turn, coupled to one or more loads 27. The load bus 26 may also receive power developed by another AC power source 28 via contactors 29. The power source 28 may comprise an AC source external of the aircraft, an on-board AC source such as a further VSCF system or an integrated drive generator (IDG), or the like. It should be noted that the arrangement of contactors shown in FIG. 1 is simplified for ease of understanding.

Figure 2:
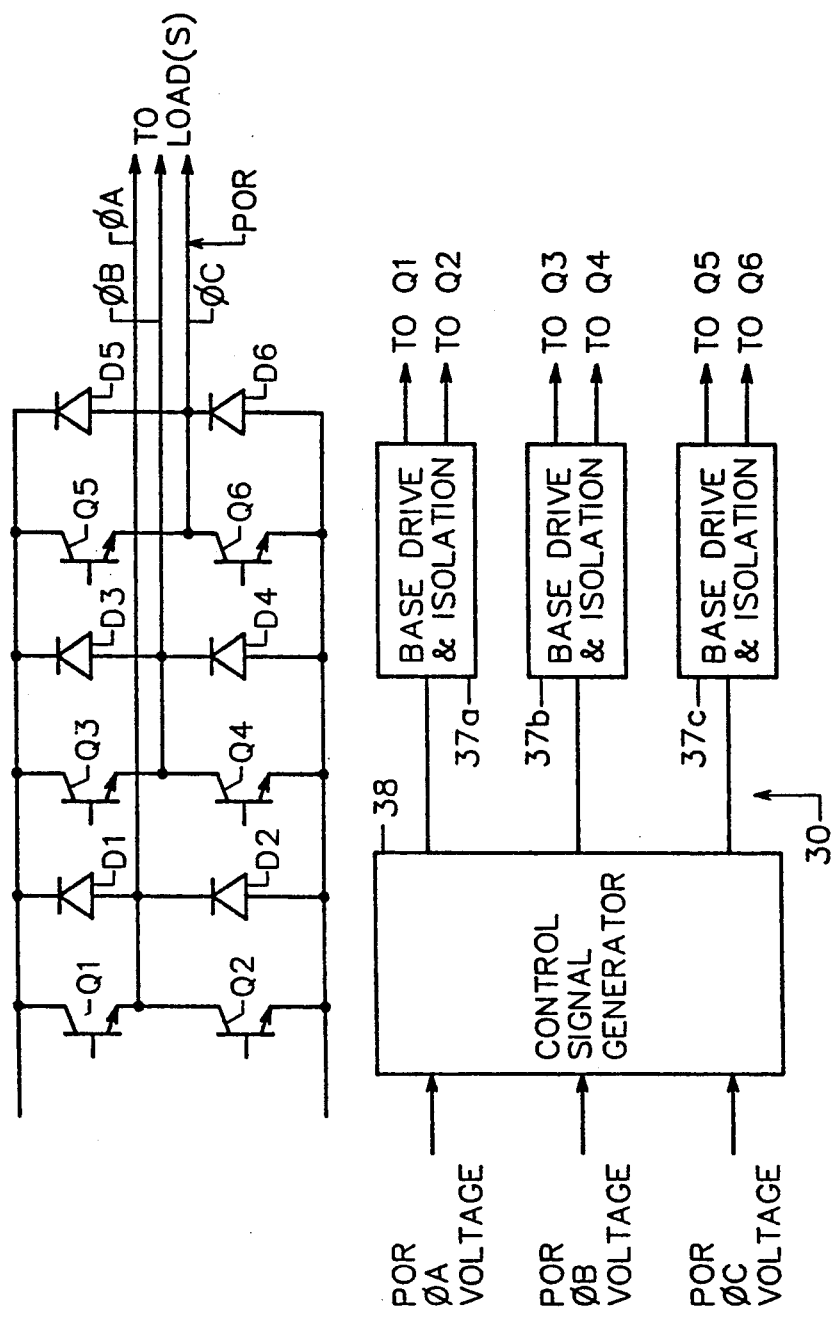
FIG. 2 is a combined schematic and block diagram of the inverter and control unit of FIG. 1.

The inverter 22 includes switches Q1–Q6, shown in FIG. 2, which are controlled by a control unit or CU 30. The CU 30 is responsive to output parameters of the inverter 22, as represented by the open arrow 31, as well as output parameters at a point of regulation (POR), here shown as being at or near the contactors 25, as represented by the open arrow 32. The CU 30 further controls the current delivered to an exciter 33 of the generator 12. The generator 12 also includes a permanent magnet generator (PMG) 34, which supplies control power to the CU 30, and a main generator portion 35 that includes armature windings in which the generator power is developed.

The contactors 25 and 29 are controlled by the CU 30 to couple the VSCF system 10 in parallel with the AC power source 28 across the load 27. The CU 30 is responsive to one phase of the power developed by the AC source 28, for example phase C, and develops a frequency reference signal as noted in greater detail hereinafter.

The switches Q1–Q6 of the inverter 22 are connected in a conventional three-phase bridge configuration together with associated flyback diodes D1–D6. The switches are controlled by base drive signals developed by base drive and isolation circuits 37a–37c. Each base drive and isolation circuit 37a–37c receives a control signal developed by a control signal generator 38 which is shown in greater detail in FIG. 3 and 4.

It should be noted that the particular inverter topology illustrated in FIG. 2 may be replaced by a different inverter topology. For example, a neutral point clamped inverter could be used, if desired.

Figure 3:
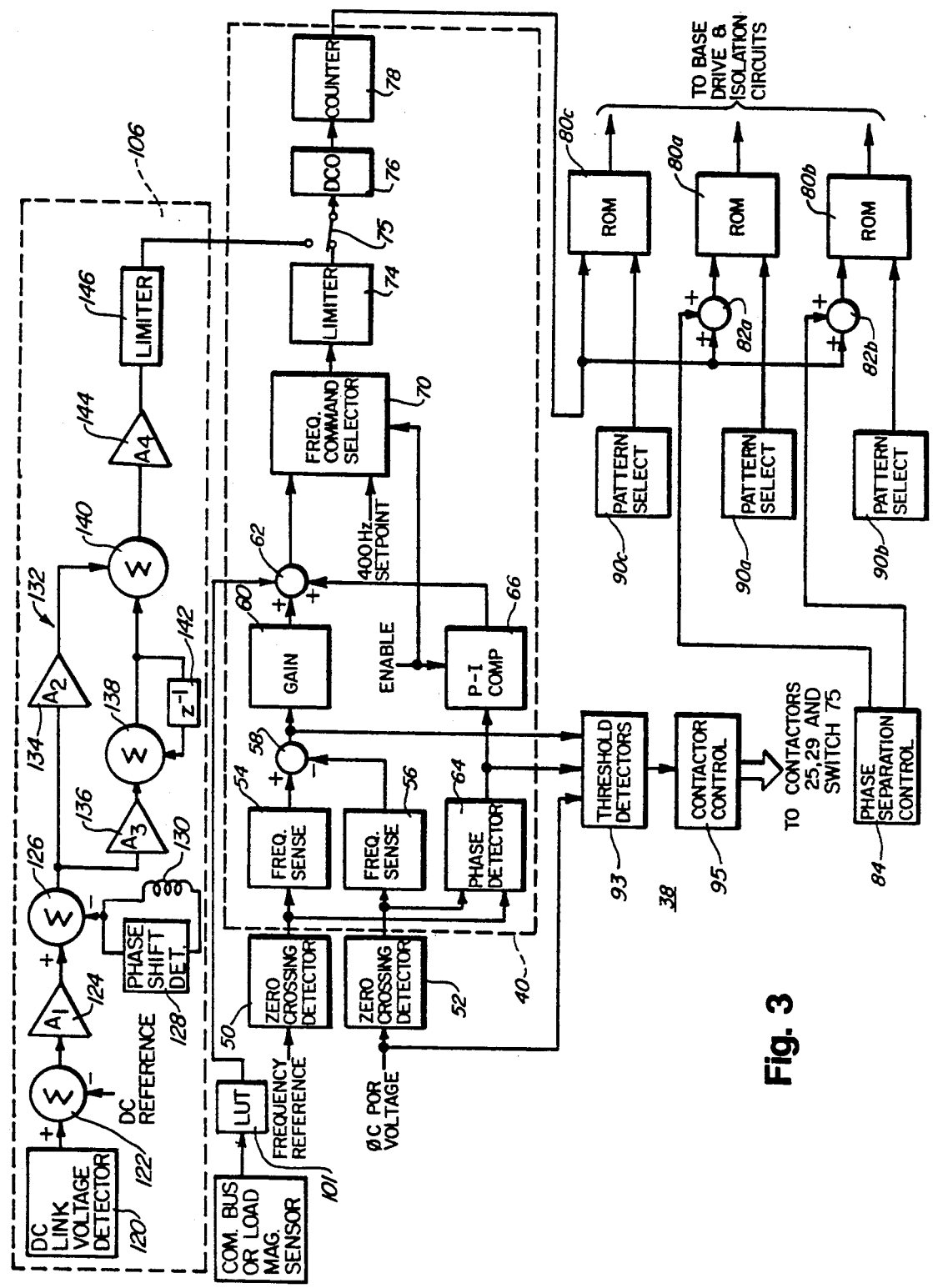
FIG. 3 comprises a block diagram representation of programming executed by the control signal generator illustrated in FIG. 2 to control the inverter of FIG. 2.

Referring now to FIG. 3, there is illustrated in greater detail a portion of the control signal generator 38. Preferably, the control signal generator 38 is implemented by software executed by a processor, although it may instead be implemented by hardware, firmware or a combination of software, hardware and firmware. The control signal generator 38 includes circuitry 40 for controlling the phase and frequency of the inverter output prior to a no-break power transfer sequence so that the contactors 25 and 29 can be simultaneously closed to connect the VSCF system 10 and the AC power source 28 in parallel across the load 27 without generation of a significant transient in the power on the load bus 26. The control signal generator 38 further includes a command signal generator (described hereinafter) according to the present invention, which causes the control unit 30 to operate the inverter 22 such that a parameter of the power of the DC link approaches a certain level.

The circuitry 40 includes first and second zero crossing detectors 50, 52 which are responsive to the frequency reference signal and the phase C voltage at the POR, respectively. The zero crossing detectors 50, 52 are coupled to frequency sensors 54, 56 having outputs which are turn coupled to noninverting and inverting inputs, respectively, of a summer 58. The summer 58 develops an error signal that is processed by a gain unit 60 and is provided to a first input of a further summer 62.

The signals developed by the zero crossing detectors 50, 52 are further provided to a phase detector 64, which is in turn coupled to a gain and compensation unit 66. The gain and compensation unit 66 is enabled by an enable signal which releases an internal integrator of the unit 66 upon issuance of a command to begin a no-break power transfer sequence. The unit 66 includes an output coupled to a further noninverting input of the summer 62.

The second summer 62 develops a summed signal which is provided to a frequency command selector circuit 70 that passes either the output of the summer 62 or a frequency reference signal representing a desired 400 hz. output to a limiter 74. The limiter 74, in turn, includes an output coupled by a switch 75 to a digitally controlled oscillator (DCO) 76. As noted in greater detail hereinafter, the switch 75 remains in the position shown in FIG. 3 until the phase C POR voltage magnitude, phase and frequency are within specified ranges of the AC source voltage magnitude, phase and frequency.

The DCO 76 may be of the form disclosed in Recker et al., U.S. Pat. No. 5,012,437, assigned to the assignee of the instant application and the disclosure of which is hereby incorporated by reference.

The DCO 76 is coupled to a counter 78 that develops low order addresses for address inputs of a reference phase memory 80c. Other phase memories 80a, 80b receive low order addresses developed by summers 82a, 82b, each having inputs coupled to the output of the counter 78. Each of the memories 80a-80c stores a plurality of pulse-width modulated (PWM) inverter control waveforms for one of the inverter phases, although it should be realized that all of the control waveforms could instead be stored in a single memory addressed on a multiplexed basis, if desired. The frequency at which successive memory locations in the memories 80a-80c are addressed is determined by the frequency of the signal developed by the DCO 76. This accessing frequency in turn determines the phase and frequency of the signals produced by the memories 80a-80c, and thus, the phase and frequency of the inverter output.

Each of the summers 82a, 82b receives phase reference signals developed by a phase separation control 84 which is described in greater detail in Rozman, et al., U.S. Pat. No. 4,875,149, assigned to the assignee of the instant application and the disclosure of which is hereby incorporated by reference. The reference signals cause the waveforms developed by the memories 80a, 80b to be displaced 120° and 240°, respectively, relative to the waveform developed at the output of the memory 80c.

Pattern select circuits 90a-90c are coupled to high order address inputs of the memories 80a-80c. The pattern select circuits 90 determine which PWM waveforms are retrieved from the memories 80a-80c and are responsive to one or more output parameters of the inverter 22. Representative pattern select circuits are shown in Recker, et al., U.S. Pat. No. 4,956,598, assigned to the assignee of the instant application and the disclosure of which is hereby incorporated by reference.

A plurality of threshold detectors 93 are responsive to the phase C POR voltage and the outputs of the summer 58 and the phase detector 64. The threshold detectors 93 are in turn coupled to a contactor control 95, which controls the contactors 25, 29 and, in addition, the switch 75.

The elements 50-95 of FIG. 3 are shown and described in greater detail in Recker, et al., U.S. Pat. No. 4,937,462, assigned to the assignee of the instant application and the disclosure of which is hereby incorporated by reference.

Figure 4:
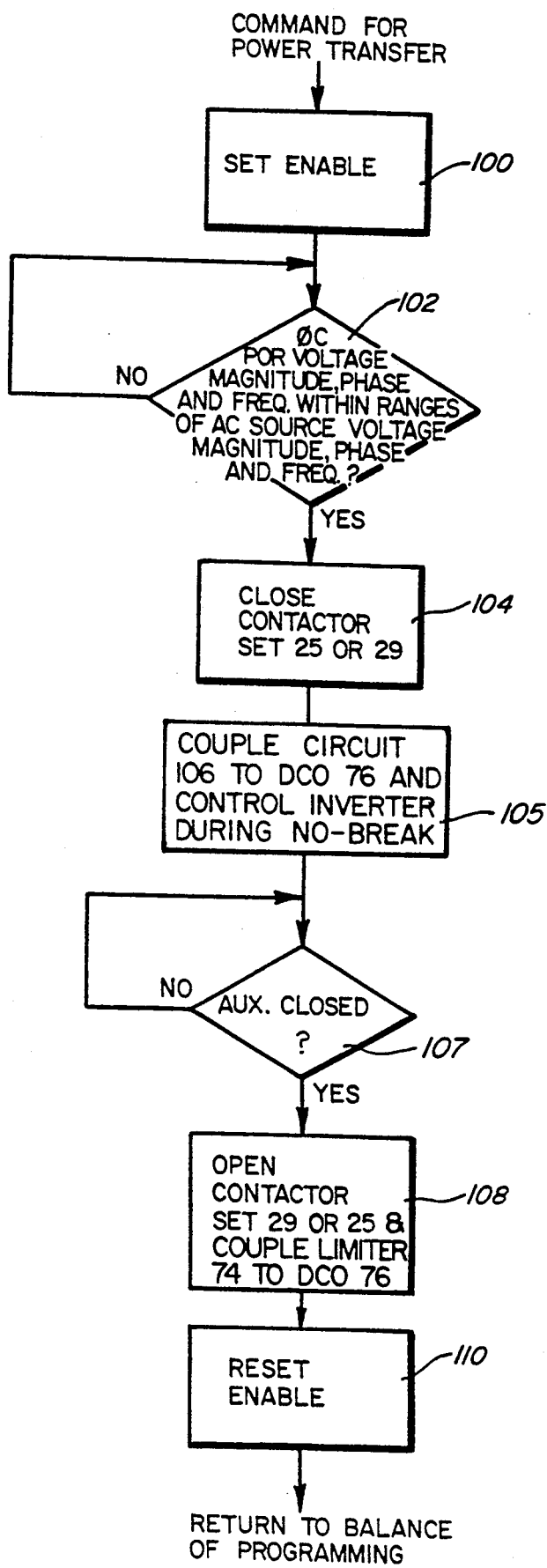
FIG. 4 is a flow chart representation of the programming executed by control signal generator of FIG. 2.

FIG. 4 illustrates programming executed by the CU 30 to execute a no-break power transfer sequence. Initially, prior to issuance of signal commanding a no-break load transfer, and one of the sets of contactors 25 or 29 is closed and the other is open so that the VSCF system 10 or the AC power source 28 is connected to the load bus 26. In addition, at this time the frequency selector 70 provides the 400 hz. frequency reference to the limiter 74 and the DCO 76. This causes the storage locations of the memories 80a-80c to be accessed at a frequency which results in generation of 400 hz. power at the inverter output. This power is not necessarily synchronized to the power developed by the AC source 28.

Upon issuance of a command signal for no-break power transfer, a block 100 sets the enable signal, resulting in delivery of the output of the summer 62 to the limiter 74. The limiter 74 thereafter controls the frequency of the output signal developed by the DCO 76 to in turn control the frequency at which successive memory locations in the memories 80a-80c are accessed. In the control disclosed in the above-identified Recker, et al. '462 patent, the phase displacement and frequency of the inverter output are controlled to approach the phase displacement and frequency of the power developed by the AC power source 28. In addition, the pattern select circuits 90a-90c select PWM waveforms from the memories to cause the magnitude of the POR voltage to approach the AC source voltage magnitude.

In an alternative embodiment, where the load 27 is initially connected to the external AC power source rather than the inverter of the VSCF system, knowledge of the magnitude of the load can be used to compensate for filter phase shifts and an inverter voltage magnitude change resulting from connection of the load to the inverter. Thus, for example, load magnitude information available on a communication bus or developed by a load magnitude sensor is detected and a signal indicative thereof is applied as an addressing input to a lookup table (LUT) 101 which in turn develops an offset signal which is supplied to the summer 62. The offset signal is summed by the summer 62 with the other signals supplied thereto and causes the phase displacement of the inverter output voltage to approach a particular phase displacement which is offset by a predetermined amount with respect to the voltage developed by the AC power source 28. The lookup table 101 thus accounts for filter phase shifts and inverter output voltage change caused by application of the load to the inverter. This, in turn, minimizes the magnitude of circulating currents and power transfers between the inverter and the AC power source 28.

Once a block 102 determines from the output of the threshold detectors 93 that the phase, frequency and magnitude of the inverter output voltage at the POR are within predetermined ranges of the phase, frequency and magnitude of the voltage developed by the AC source 28, a block 104 causes the contactor control 95 to close the open contactors 25 or 29 to thereby connect the VSCF system 10 in parallel with the AC power source 28. In addition, the contactor control 95 moves the switch 75 to the position opposite that shown in FIG. 3 so that the input of the DCO 76 is connected to a command signal generator 106 that develops a frequency command signal for the DCO 76. The circuit 110 effects closed loop control over the voltage appearing on the DC link 20 so that elevated and sagging DC link voltages within the VSCF system 10 and overcurrent conditions are avoided.

Following the block 105, a block 107 checks auxiliary contactors AUX of the contactor sets 25 or 29 to ascertain when the contactor set 25 or 29 commanded to be closed by the block 104 has in fact closed. Once this determination has been made, a block 108 opens the other set of contactors 25 or 29 so that the VSCF system 10 or the power source 28 is disconnected from the loads 27. A block 110 then resets the enable signal causing resetting of the internal integrator in the unit 66 and coupling of the 400 hz. set point to the limiter 74.

Following the block 110, control returns to the balance of the programming executed by the CU 30.

Referring again to FIG. 3, the command signal generator 106 includes a detector 120 for sensing the DC link voltage and a summer 122 that subtracts a signal representing a desired DC link voltage from the signal produced by the detector 120 to develop an error signal. The desired DC link voltage comprises the voltage appearing on the DC link 20 just prior to closure of the contacts 25 or 29. The error signal is processed by a scaler 124 and the resulting degrees per volt command signal is provided to a further summer 126 which subtracts therefrom a signal proportional to the phase difference between the output power at the POR and the power produced by the AC power source 28. This phase difference signal is developed by a phase shift detector 128 that detects the phase shift across an inductor 130 of the filter 24 connected in series with one phase of the inverter output 22. The signal developed by the phase shift detector 128 is also roughly proportional to the rate of change of DC link voltage.

The signal developed by the summer 126 is an error signal indicative of the variation of phase difference from a commanded level. This signal may be used as a command signal for the inverter 22 and is processed by a gain and compensation unit including a proportional integral (P-I) loop 132 comprising scalers 134, 136, summers 138, 140 and a feedback impedance 142. The signal developed by the summer 140 is scaled by a scaler 144 and processed by a limiter 146 to develop the frequency command signal. The limits provided by the limiter are a function of the particular characteristics of the VSCF system 10.

If desired, the P-I loop 132 and/or the scaler 144 and the limiter 146 may be replaced by any other gain and compensation unit to provide gain and compensation as desired for the frequency command signal.

The frequency command signal delivered to the DCO 76 is based upon a detected phase error. Also, the integrator implemented by the elements 136, 138 and 142 comprises a low-pass filter. Hence, the present invention can be considered to be a phase-locked loop (PLL) that controls the inverter 22 during a no-break power sequence to compensate for drifting AC sources so that circulating currents that can result in elevated DC link voltages and overcurrent operation are minimized.

In fact, it should be noted that the circuit 106 in conjunction with the DCO 76 and other elements downstream therefrom may be used to permit continuous parallel operation of the VSCF system 10 with an external AC power source.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. In a DC link power converter wherein the power converter includes an inverter that receives DC power carried on a DC link and produces a first AC waveform having a phase displacement at an output of the power converter and wherein inverter and an AC power source are connected in parallel such that the first AC waveform produced by the inverter and a second AC waveform produced by the AC power source are supplied to a load, the converter further including means responsive to a command signal for controlling the phase displacement of the first AC waveform under circulating current conditions between the inverter and the AC power source, the improvement comprising:

a command signal generator responsive to the DC power and coupled to the controlling means wherein the command signal generator develops the command signal whereby the command signal causes a parameter of the DC power to approach a certain level under the circulating current conditions, said command signal generator including:

a voltage detector that develops a voltage magnitude signal representing a DC voltage on the DC link;

a first summer for summing the voltage magnitude signal with a reference signal to develop an error signal; and, means responsive to the error signal for deriving the command signal from the error signal.

2. The improvement of claim 1, wherein the deriving means includes a scaler coupled to the first summer for developing a scaled representation of the error signal and a second summer coupled to the scaler for summing the scaled representation with a phase angle signal representing a phase angle between the phase displacement of the first AC waveform and a phase displacement of the second AC waveform.

3. The improvement of claim 2, wherein the deriving means further includes a gain and compensation unit coupled to the second summer.

4. The improvement of claim 3, wherein the gain and compensation unit comprises a proportional plus integral loop.

5. The improvement of claim 4, wherein the gain and compensation unit further includes a limiter coupled to the proportional plus integral loop.

6. In a DC link power converter wherein the power converter includes an inverter that receives DC power carried on a DC link and produces a first AC waveform having a phase displacement at an output of the power converter and wherein inverter and an AC power source are connected in parallel such that the first AC waveform produced by the inverter and a second AC waveform produced by the AC power source are supplied to a load, the converter further including means responsive to a command signal for controlling the phase displacement of the first AC waveform under circulating current conditions between the inverter and the AC power source, the improvement comprising:

a command signal generator responsive to the DC power and coupled to the controlling means wherein the command signal generator develops the command signal whereby the command signal causes a parameter of the DC power to approach a certain level under the circulating current conditions and wherein the inverter is disconnected from the load and receives a further command signal developed by a further command signal generator prior to a certain time and wherein the further command signal generator includes means for indicating a load magnitude prior to the certain time and means responsive to the indicating means for deriving the further command signal.

7. The improvement of claim 6, wherein the indicating means develops a load signal representing the load magnitude and wherein the modifying means includes a look-up table accessed by the load signal and developing an offset signal.

8. A command signal generator for developing a command signal for a control of a DC link power conversion system wherein the system includes an inverter operated by the control to convert a DC voltage having a magnitude on a DC link into a first AC voltage at an output of the system and wherein the first AC voltage produced by the inverter and a second AC voltage produced by an AC power source are provided in parallel to a load and the first and the second AC waveforms have first and second phase displacements, respectively, comprising:

a voltage detector coupled to the DC link and developing a magnitude signal representing the DC voltage magnitude;

a first summer coupled to the voltage detector that sums the magnitude signal with a reference signal to derive a first error signal;

a scaler coupled to the first summer for scaling the first error signal;

means for developing a phase angle signal representing a phase angle between the first and second phase displacements;

a second summer coupled to the scaler and the developing means that sums the scaled first error signal with the phase angle signal to derive a second error signal; and a gain and compensation unit coupled to the second summer that develops the command signal from the second error signal.

9. The circuit of claim 8, wherein the gain and compensation circuit includes a proportional plus integral loop.

10. The circuit of claim 9, wherein the gain and compensation circuit further includes a limiter coupled to the proportional plus integral loop.

11. The control of claim 8, wherein the inverter is disconnected from the load and receives a further command signal developed by a command signal generator prior to a certain time and wherein the command signal generator includes means for indicating a load magnitude prior to the certain time and means responsive to the indicating means for deriving the further command signal.

12. The control of claim 11, wherein the indicating means develops a load signal representing the load magnitude and wherein the modifying means includes a look-up table accessed by the load signal and developing an offset signal.

* * * * *